Figure 1:
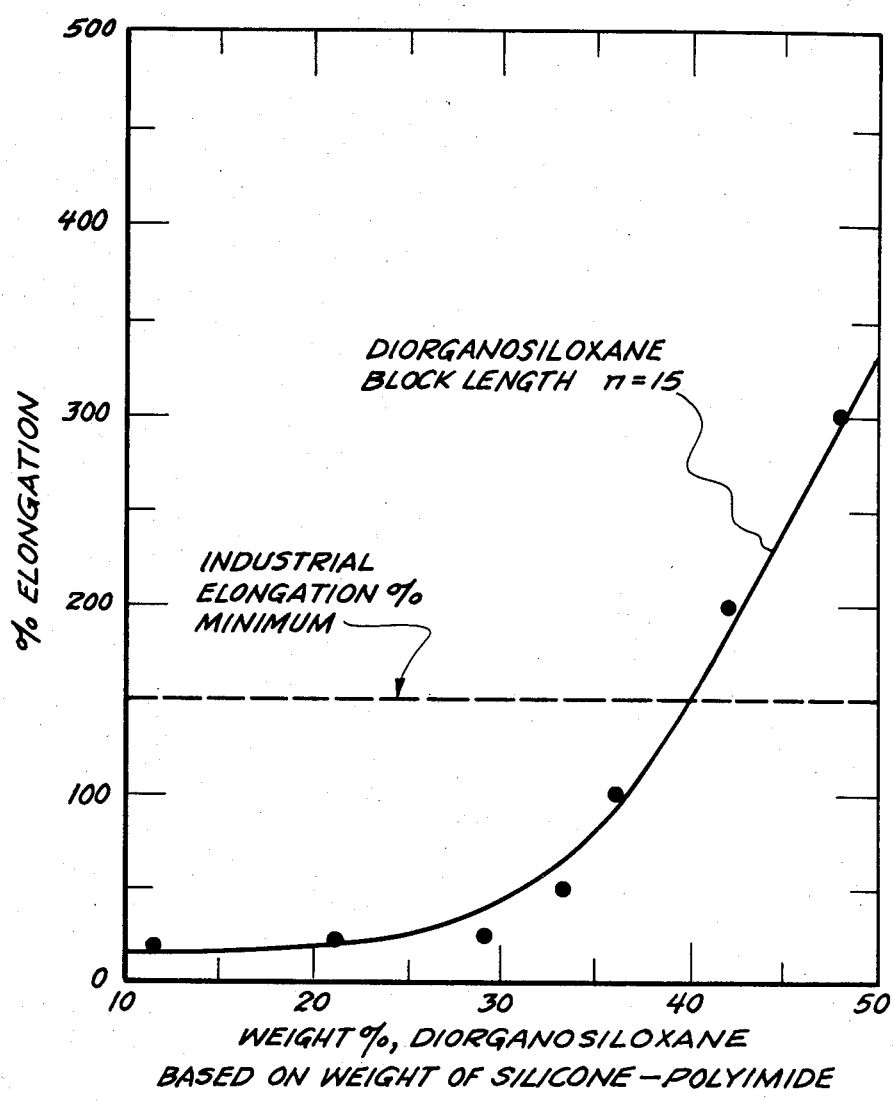

United States Patent [19]

Cella et al.

[11] Patent Number: 4,690,997

[45] Date of Patent: Sep. 1, 1987

[54] FLAME RETARDANT WIRE COATING COMPOSITIONS

[75] Inventors: James A. Cella, Clifton Park; Marsha M. Grade; Thomas L. Evans, both of Schenectady, all of N.Y.

[73] Assignee: General Electric Company, Schenectady, N.Y.

[21] Appl. No.: 760,792

[22] Filed: Jul. 31, 1985

Related U.S. Application Data

[63] Continuation-in-part of Ser. No. 574,118, Jan. 26, 1984, abandoned.

[51] Int. Cl.$^4$ ............................................. C08G 77/04
[52] U.S. Cl. ...................................... 528/26; 528/28; 528/38
[58] Field of Search .............................. 528/26, 28, 38

[56] References Cited

U.S. PATENT DOCUMENTS

| | | | |
|---|---|---|---|
| 3,325,450 | 6/1967 | Holub | 528/21 |
| 3,833,546 | 9/1974 | Takekoshi | 528/28 |
| 4,030,948 | 6/1977 | Berger | 528/26 |
| 4,051,163 | 9/1977 | Berger | 528/26 |
| 4,395,527 | 7/1983 | Berger | 528/26 |

*Primary Examiner*—Melvyn I. Marquis
*Attorney, Agent, or Firm*—William A. Teoli; James C. Davis, Jr.; James Magee, Jr.

[57] ABSTRACT

Flame retardant silicon-polyimides are provided having improved elongation which are useful as wire coating compositions.

10 Claims, 2 Drawing Figures

FLAME RETARDANT WIRE COATING COMPOSITIONS

CROSS-REFERENCE TO RELATED APPLICATION

This application is a continuation-in-part of copending application of Thomas L. Evans for Silicone-Polyimide Compositions, Ser. No. 574,118, filed Jan. 26, 1984, now abandoned, which is assigned to the same assignee as the present invention and incorporated herein by reference.

BACKGROUND OF THE INVENTION

Prior to the present invention, as shown by Holub, U.S. Pat. No. 3,325,450, polysiloxane imides useful as insulation for electrical conductors were prepared by effecting reaction between the diaminopolysiloxane and benzophenonedianhydride in the presence of a suitable organic solvent, such as dimethylformamide, N-methyl-2-pyrrolidone, cresol, etc. The initial reaction was generally carried out from room temperature of 150° C. resulting in the production of an intermediate polyamide acid derivative. Thereafter, the solvent was removed from the resulting amide acid derivative by heating at temperatures of from about 150° C. to 400° C. to effect cyclization and formation of the imide structure.

A similar procedure is shown by Greber, Polykondensationsreaktionen Bifunktioneller Siliciumorganischer Verbindungen, Journal fur praktische Chemie. Band 313, HEFT 3, 1971, S. 461-483, J. A. Barth, Leipzig. Although the procedure of Greber is somewhat different from that shown by Holub, both Holub and Greber utilize a dipolar aprotic solvent, such as dimethylacetamide to form a solution of a silicone-polyamide acid from which films can be cast onto a substrate and further heating is required to effect the cyclization of the polyamide acid to the polyimide state.

Improved results in methods for making silicone-polyimides can be obtained by utilizing aromatic bis(ether anhydride) or the corresponding tetracarboxylic acid in combination with amino alkylene terminated polydiorganosiloxanes as shown, for example, by Takekoshi et al., U.S. Pat. No. 3,833,546 and Heath et al., U.S. Pat. No. 3,847,867, assigned to the same assignee as the present invention.

Although silicone-polyimides have long been recognized for their potential as a source for extrudable wire coating insulation, the flammability requirements of the wire coating industry has generally restricted the use of these materials. In addition to flame retardance, wire coating fabricators also favor extrudable wire coating insulation having at least 150% elongation at break when pulled laterally from a clamped portion of the extrudate along the wire surface. However, efforts to increase the elongation characteristics of silicone-polyimide by increasing the weight percent of silicone has generally been found to increase the flammability of the silicone-polyimide.

The present invention is based on a discovery that silicone-polyimide utilizing aromatic bis(ether anhydride) and amino alkylene terminated polydiorganosiloxane having a critical block length can be extruded onto wire and exhibit an elongation percent of 150 or greater while satisfying UL 94 flammability requirements as defined hereinafter. Wire coating industry requirements can be satisfied providing a critical relationship is maintained between the polydiorganosiloxane block length and the weight percent silicone which is preferably 25% to 45% by weight based on the weight of silicone-polyimide. Polydiorganosiloxane block lengths having an average value of about 20 diorganosiloxy units or less has been found to provide effective results, while a block length of about 5 to about 15 chemically combined diorganosiloxy units is preferred.

As used hereinafter, the expressions "flame resistance", "flammable", "nonflammable" or "flame retardance" with respect to silicone-polyimide means that the silicone-polyimide has satisfied UL 94 V-O requirements for flammability as shown by the Flammability of Plastic Materials Bulletin of Jan. 24, 1980. More particularly, a $5'' \times \frac{1}{2}'' \times \frac{1}{8}''$ silicone-polyimide test bar was suspended vertically over a $\frac{3}{4}''$ Bunsen burner flame as provided in the aforementioned UL 94 test. The test sample exhibited a 94 V-O rating, which includes the following criteria:

A. Not have any specimen which burn with flaming combustion for more than 10 seconds after either application of the test flame.
B. Not have a total flaming combustion time exceeding 50 seconds for the 10 flame applications for each set of five specimens.
C. Not have any specimens which burn with flaming or glowing combustion up to the holding clamp.
D. Not have any specimens which drip flaming particles that ignite the dry absorbent surgical cotton located 12 inches (305 mm) below the test specimen.
E. Not have any specimens with glowing combustion which persists for more than 30 seconds after the second removal of the test flame.

The silicone polyimides of the present invention can be made by effecting reaction between amine terminated polydiorganosiloxane having the formula

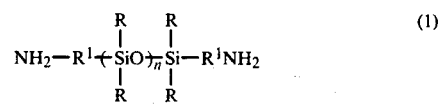

and organic dianhydrides, as defined hereinafter, where R is a $C_{(1-14)}$ monovalent hydrocarbon radical or substituted $C_{(1-14)}$ monovalent hydrocarbon radical, $R^1$ is a $C_{(1-14)}$ divalent hydrocarbon radical or substituted $C_{(1-14)}$ divalent hydrocarbon radical, and n is an integer having an average value of from about 3 to 20 inclusive, and preferably 5 to 15. $R^1$ is preferably $C_{(1-14)}$ polymethylene.

STATEMENT OF THE INVENTION

There is provided by the present invention, extrudable, flame retardant, silicone-polyimide copolymer comprising by weight, (A) from about 40 to 90% of chemically combined arylimide blocks and
(B) from about 10 to 60% of chemically combined polydiorganosiloxane blocks consisting essentially of from about 3 to about 20 diorganosiloxy units, where the organo radicals attached to silicone are selected from monovalent $C_{(1-14)}$ hydrocarbon radicals and substituted monovalent $C_{(1-14)}$ hydrocarbon radicals.

Chemically combined arylimide blocks which can be present in the silicone-polyimide compositions of the present invention are included within the formula,

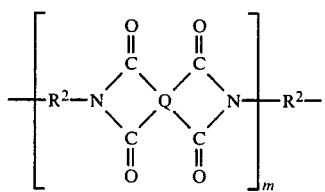
(2)

where $R^2$ is selected from $R^1$ radicals, or the same or different $C_{(1-14)}$ monovalent hydrocarbon radicals and substituted $C_{(1-14)}$ monovalent hydrocarbon radicals, Q is a tetravalent radical selected from

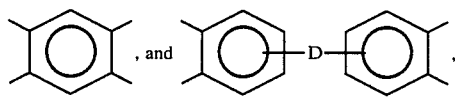

D is a member selected from

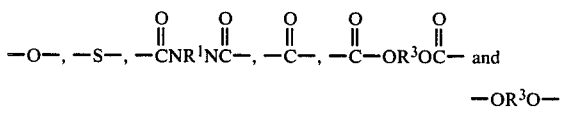

and $R^3$ is a divalent radical selected from

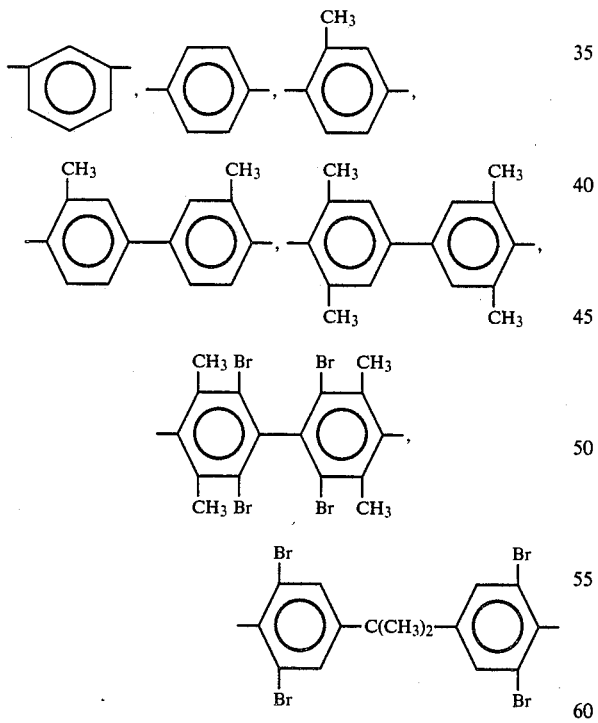

and divalent organic radicals of the general formula,

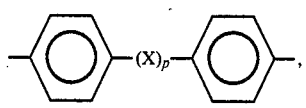

X is a member selected from the class consisting of divalent radicals of the formula,

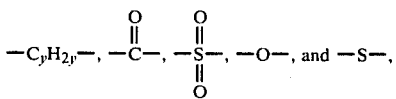

p is 0 or 1, y is an integer equal to 1 to 5 inclusive and m is an integer equal to from 1 to about 60 inclusive.

Among the preferred arylimide included within formula (2) there is included aryletherimide of the formula

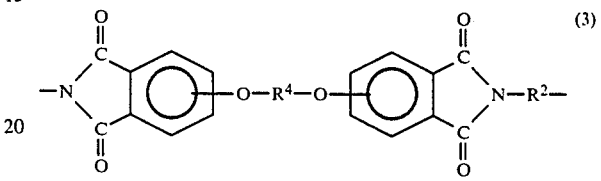
(3)

where $R^2$ is a previously defined, and $R^4$ is a divalent aryl radical selected from the class consisting of

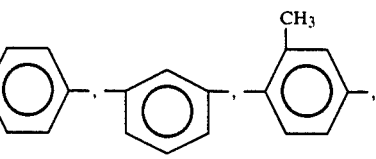

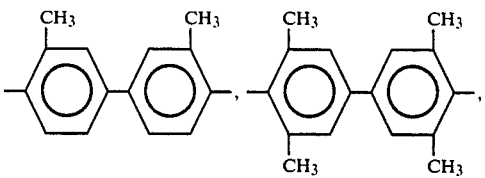

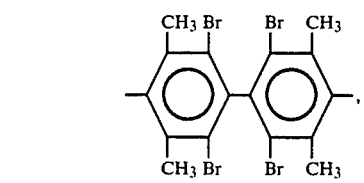

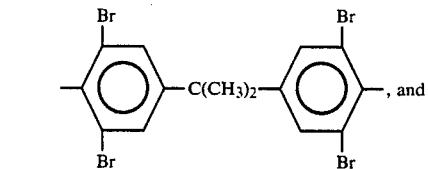

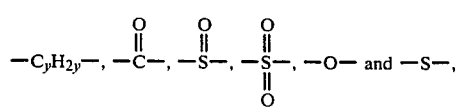

$X^1$ is a member selected from the class consisting of $-C_yH_{2y}-$, $-\overset{O}{\underset{}{C}}-$, $-\overset{O}{\underset{}{S}}-$, $-\overset{O}{\underset{O}{S}}-$, $-O-$ and $-S-$, and p and y are a previously defined.

Radicals included within R of formula (1) are, for example, $C_{(1-8)}$ radicals such as methyl, ethyl, propyl, butyl, pentyl, etc.; $C_{(6-13)}$ aryl radicals such as phenyl, tolyl, xylyl, anthryl; halogenated alkyl and aryl radicals such as chlorophenyl; cyanoalkyl radicals, for example, cyanoethyl, cyanobutyl, trifluoropropyl, etc. Radicals included within $R^1$ and $R^2$ of formulas (1) and (2) are, for example, $C_{(1-8)}$ alkylene radicals such as methylene, dimethylene, trimethylene, tetramethylene, etc. and arylene radicals such as phenylene, tolylene, xylene, naphthalene, etc.

Organic anhydrides which can be utilized in the practice of the present invention are preferably aromatic bis(etheranhydride)s which are included within the formula,

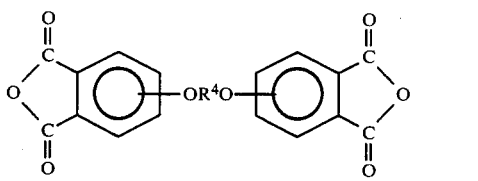
(4)

where $R^4$ is as previously defined. Some of the dianhydrides included within formula (4) are, for example, 2,2'-bis[4-(2,3-dicarboxyphenoxy)phenyl]propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3-dicarboxyphenoxy)diphenyl sulfide dianhydride;
1,4-bis(2,3-dicarboxyphenoxy)benzene dianhydride;
4,4'-bis(2,3-dicarboxyphenoxy)diphenylsulfone dianhydride, etc.;
2,2-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)diphenylsulfone dianhydride;
4-(2,3-dicarboxyphenoxy)-4'(3,4-dicarboxyphenoxy)-2,2-diphenylpropane dianhydride, etc.

The dianhydrides of formula (4) can be made in accordance with Webb, U.S. Pat. No. 4,116,980, assigned to the same assignee as the present invention.

In addition to the preferred aromatic bis(ether anhydrides) of formula (4), there can be used other organic dianhydrides in combination with such aromatic bis(ether anhydrides) to make the silicone-polyimide wire coating compositions of the present invention. These organic dianhydrides can be used at up to 50 mole percent based on total dianhydride and include pyromellitic dianhydrides, benzophenone dianhydride and 5,5'-(1,1,3,3-tetramethyl-1,1,3-disiloxanedilyl-bis-norbornane-2,3-dicarboxylic dianhydride.

Procedures for making the aminoorgano terminated polydiorganosiloxane of formula (1) are well known in the art. For example, aminoorganotetraorganodisiloxane can be equilibrated with an octaorganocyclotetrasiloxane, such as octamethylcyclotetrasiloxane, to increase the block length of the polydiorganosiloxane. The corresponding aminoorganotetraorganodisiloxane, such as aminobutyltetramethyldisiloxane can be made by the procedure shown by Prober, U.S. Pat. No. 3,185,719, assigned to the same assignee as the present invention. Prober reacts allylcyanide with dimethylchlorosilane and then hydrolyzes the resulting cyanopropyldimethylchlorosilane in the presence of sodium bicarbonate to produce the 1,3-bis-γ-cyanopropyltetramethyldisiloxane which then can be reduced with hydrogen in the presence of Raney nickel to yield 1,3-bis-γ-aminobutyltetramethyldisiloxane. In a similar manner, 1,3-aminopropyl terminated polydimethylsiloxane can be obtained by the equilibration of 1,3-bis-γ-aminopropyltetramethyldisiloxane which is prepared by utilizing acrylonitrile in a manner similar to that shown for the production of aminobutyltetramethyldisiloxane utilizing allylcyanide.

In addition to the aminoorganopolydiorganosiloxane in formula (1), there can be utilized in making the silicone-polyimides of the present invention, up to about 90 mole percent of aryldiamines based on the total moles of the aminoorganopolydiorganosiloxane of formula (1) and such aryldiamines having the formula

where $R^5$ is a divalent $C_{(6-14)}$ arylene radical.

Included within the arylamines of formula (5) are, for example, m-phenylene diamine;
p-phenylenediamine;
4,4'-diaminodiphenylpropane;
4,4-diaminodiphenylmethane;
benzidine;
4,4'-diaminodiphenyl sulfide;
4,4'-diaminodiphenyl sulfone;
4,4'-diaminodiphenyl ether;
1,5'-diaminonaphthalene;
3,3'-dimethylbenzidine;
3,3'-dimethoxybenzidine;
2,4-bis(β-amino-t-butyl)toluene;
bis(p-β-amino-t-butylphenyl)ether;
bis(p-β-methyl-o-aminopentyl)benzene;
1,3'-diamino-4-isopropylbenzene;
1,2-bis(3-aminopropoxy)ethane;
m-xylylenediamine;
p-xylylenediamine;
2,4-diaminotoluene;
2,6-diaminotoluene.

In instances where aryldiamine of formula (5) is used in combination with the aminoorgano terminated polydiorganosiloxane of formula (1), the weight percent of the aryldiamine is included in the weight percent of the arylimide.

Figure 2:
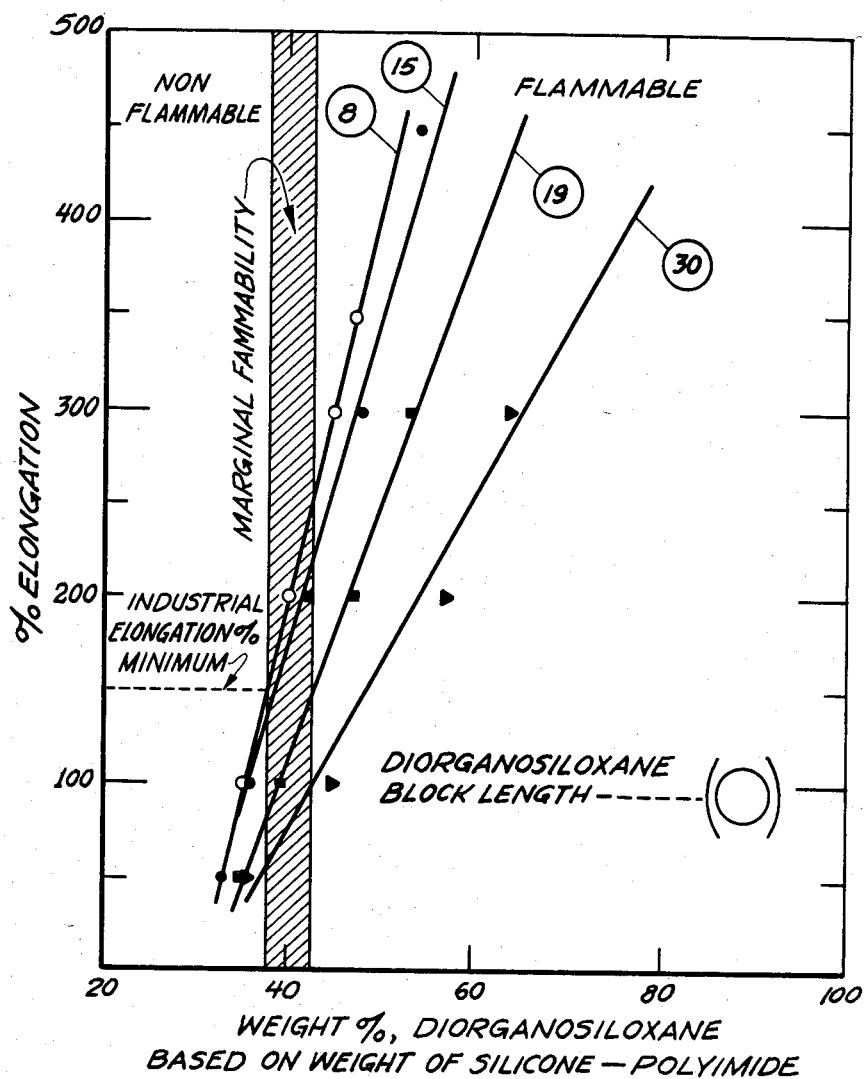

In FIG. 1 of the drawings, there is shown a graph illustrating the relationship between weight percent of diorganosiloxane and % elongation of silicone-polyimide having a diorganosiloxane and an average block length of about 15 diorganosiloxy units. In FIG. 2, there is further illustrated the relationship between weight percent diorganosiloxane and % elongation for several silicone-polyimides having an average block length ranging from about 8 to about 30 chemically combined diorganosiloxy units. In addition, FIG. 2 also shows the relationship between flammability and weight % of diorganosiloxane based on weight of silicone-polyimide.

The silicone-polyimides can be made by effecting reaction between the organic anhydride, which hereinafter means aromatic bis(ether anhydride) of formula (4) or a mixture thereof with other organic anhydrides, and amino polydiorganosiloxane which hereinafter will mean the aminoorgano terminated polydiorganosiloxane of formula (1), or a mixture thereof with aryldiamine of formula (5) in a suitable organic solvent. Some of the organic solvents which can be used are, for example, dipolar aprotic solvents, such as dimethylformamide, N-methyl-2-pyrrolidone, cresol, orthodichlorobenzene, etc. In general, there can be used from about 0.9 to 1.1 mole of the amine functional groups in the terminal position on the aminoorgano terminated polydiorganosiloxane, per mole of the anhydride functional groups of the organic anhydride.

The initial amino-organic anhydride reaction can be carried out from about 100° C. to 300° C. Reaction can continue until the water of reaction produced during the copolymerization of the organic anhydride and the aminoorgano terminated polydiorganosiloxane is achieved and the water of reaction is completely removed such as by azeotroping from the reaction mixture. There can be used a typical polymerization catalyst at 0.025 to 1.0% by weight, based on the weight of the reaction mixture, such as an alkali metal aryl phosphinate or alkali metal aryl phosphonate, for example, sodium phenylphosphonate.

At the completion of the polymerization reaction, the silicone-polyimide can be isolated by diluting the reaction mixture with a material such as chloroform to reduce the solids level to about 10% and reprecipitating the resulting mixture in an organic solvent such as isopropanol. The resulting product can thereafter be dried by conventional means such as a vacuum oven.

The silicone-polyimides of the present invention are valuable as wire coating compositions and can be extruded onto metallic conductors such as aluminum or copper wire to thicknesses up to 50 mil. During the polymerization reaction, a chain-stopper, such as a monofunctional aromatic anhydride or monofunctional aromatic amine, for example, aniline or phthalic anhydride, can be used if desired to control the molecular weight of the silicone-polyimide.

In order that those skilled in the art will be better able to practice the present invention, the following examples are given by way of illustration and not by way of limitation. All parts are by weight unless otherwise specified.

EXAMPLE 1

A series of 3-aminopropyldimethylsiloxy terminated polydimethylsiloxanes were prepared having an average of from about 8 to about 30 dimethylsiloxy units. The procedure for making a 3-aminopropyl terminated polydimethylsiloxane having an average of about 9.5 dimethylsiloxy units was as follows:

A mixture of 102.52 moles of bis-(3-aminopropyl)tetramethyldisiloxane and 230.66 moles of octamethylcyclotetrasiloxane and 1.0 moles of tetramethylammonium hydroxide was stirred at a temperature of about 80° C. for 6 to 8 hours under a nitrogen atmosphere. The equilibration was monitored by gas chromatography. When the equilibration was completed, the temperature was raised to 150° C. to effect catalyst decomposition and devolatilization of from 10–15% by weight of low molecular cyclics. The mixture was allowed to cool to room temperature and then titrated for amine end groups with standardized perchloric acid in acetic acid using methyl violet at the indicator. There was obtained a 3-aminopropyldimethylsiloxy polydimethylsiloxane having an average of about 9.5 dimethylsiloxy units and a molecular weight of about 949.13 per chain.

A silicone-polyimide was prepared in accordance with the following procedure:

A mixture of 7.502 grams of 2,2-bis[4-(3,4-dicarboxyphenoxy)phenyl]propane dianhydride, 0.178 grams of phthalic anhydride, 0.811 grams of metaphenylenediamine, 6.173 grams of a 3-aminopropyldimethylsiloxy terminated polydimethylsiloxane having an average of 7.7 dimethylsiloxy units per chain, 40 ml. of orthodichlorobenzene and 0.004 gram of sodium phenylphosphinate was heated under a positive nitrogen pressure at 140° C. for 1 hour. Solvent and water were removed from the reaction mixture until a total of about 15 ml. of orthodichlorobenzene was collected resulting in a reaction mixture having about 30% solids. The mixture was refluxed for an additional 4 hours and then allowed to cool. The cooled reaction mixture was diluted with 25 ml. of chloroform and poured with vigorous stirring into 250 ml. of isopropanol. A product was isolated by filtration and washed with copious quantities of isopropanol. The resulting solid was dried for at least 4 hours at 120°–150° C. in a vacuum oven. The dried solid was then redissolved in chloroform (to 15% solid) and again reprecipitated into isopropanol. There was obtained 11.4 grams for an 81% yield of a silicone-polyimide after drying in a vacuum oven. Based on method of preparation the resulting silicone-polyimide consisted essentially of polyimide having 42% by weight of polydimethylsiloxane blocks having an average of about 7.3 dimethylsiloxy units.

Several additional silicone polyimides were prepared from a 3-aminopropyl dimethylsiloxy terminated polydimethylsiloxane having an average of about 15 dimethylsiloxy units. These silicone polyimides varied over a weight percent range of 29–48 of chemically combined polydimethylsiloxane based on weight of silicone-polyimide. Tensile elongations were determined from extruded strands obtained from dried polymer charged to a Tinius-Olsen Extrusion Plastometer heated to 275°–320° C.

The results of those measurements are shown in FIG. 1 and in the following table:

TABLE I

| Effect of Wt % Dimethylsiloxane On Percent Elongation | |
|---|---|
| Wt % Siloxane | % Elongation |
| 29 | 25 |
| 33 | 50 |
| 36 | 100 |
| 42 | 200 |
| 48 | 300 |

The above results show that percent elongation is dependent on the weight percent of diorganosiloxane in silicone-polyimide.

EXAMPLE 2

The procedure of Example 1 was repeated to provide several silicone-polyimides with polydimethylsiloxane blocks having from about 8–30 chemically combined dimethylsiloxy units. The silicone-polyimides were evaluated for elongation and flammability in accordance with UL-94 as shown in FIG. 2 and the following table:

TABLE II

Flammability and Percent Elongation of Silicone-Polyimide

| Siloxane Block Length | Wt % Diorgano-Siloxane | % Elongation | UL-94 Flame Out* Time (sec) |
|---|---|---|---|
| 9.5 | 37 | 200 | 21 |
| 11 | 42 | 230 | 48 |
| 15 | 37 | 25 | 28 |
| 20 | 46 | 190 | 45 |
| 30 | 57 | 200 | >50 sec |

*Flame out time (FOT) average for 10 ignitions

The above results show that silicone-polyimide wire coating compositions having an average block length of from about 8 to about 20 dimethylsiloxy units, can provide a percent elongation of at least 150%, while satisfying the V-O requirements of less than 50 seconds FOT for an average of 10 ignitions. An average block length of about 30 required too much chemically combined methylsiloxane to achieve a satisfactory degree of elongation which rendered it flammable.

EXAMPLE 3

In accordance with the procedure of Thames et al, Journal of Organic Chemistry, A. Org. Chem. 1975, 40, 1090, there was prepared 3-bromo-N,N-bis(trimethylsilyl)aniline.

There was added 2.6 moles of butyl lithium in hexane over a 15 minute period to a mixture of 50 grams of the 3-bromo-N,N-bis(trimethylsilyl)aniline in 400 ml. of anhydrous ether cooled to 0° C. under a nitrogen atmosphere. The resulting reaction mixture was allowed to stir for an additional 2 hours at 0° C. The mixture was then added to a mixture of 100 ml. of anhydrous ether and 16.06 grams of 1,3-dichloro-1,1,3,3-tetramethyl-disiloxane at 0° C. After the solution was filtered and the solvents were removed under reduced pressure, there was obtained a 77% yield of 1,3-bis[N,N-bis(-trimethylsilyl)-3-aminophenyl]-1,1,3,3-tetramethyl-disiloxane in the form of a pale-yellow oil having a boiling point of about 169°-174° C.

A mixture of 38 grams of the above-bis-substituted trimethylsilylaminophenyltetramethyldisiloxane, 30 grams of methanol, 100 milligrams of p-toluene sulfonic acid monohydrate and 300 ml. of anhydrous ether was stirred for 12 hours at room temperature. The resulting etherial solution was washed with two 100 ml. portions of a saturated sodium bicarbonate solution and then with 100 ml. of brine. The organic phase was dried over anhydrous magnesium sulfate, filtered and the solvents were removed under reduced pressure. There was obtained a 90% yield of a pale-yellow oil after vacuum distillation of the crude product which had a boiling point of 169°-174° C. Based on method of preparation and NMR spectra, the product was 1,3-bis(m-aminophenyl)-1,1,3,3-tetramethyldisiloxane.

A mixture of 4.8 grams of the above 1,3-bis(m-aminophenyl)-1,1,3,3-tetramethyldisiloxane, 22.48 grams of octamethylcyclotetrasiloxane and 30 milligrams of powdered potassium hydroxide was heated at 150° C. for 12 hours under a nitrogen atmosphere. The temperature was lowered to 120° C. and 68 milligrams of sodium bicarbonate was added. The reaction mixture was stirred for 1 hour at 120° C. and then cooled to 90° C. The reaction mixture was diluted with 100 ml. of toluene. After an additional heating for 30 minutes at 90° C., the solution was cooled to room temperature and filtered. There was obtained a yellow oil. Based on method of preparation, IR spectra and NMR spectra the resulting product was a polysiloxanediamine. Based on the average molecular weight of the isolated material (20.6 grams determined by titration) the average length of the polysiloxane was found to be sufficient to provide a value of n of about 19–21.

A mixture of 16.84 grams of the above aminophenyl terminated polydimethylsiloxane and 4.636 grams of 2,2-bis-[4-(3,4-dicarboxyphenoxy)phenyl]propane dianhydride dissolved in 40 ml. of orthodichlorobenzene along with 0.0012 gram of sodium phenylphosphinate. The resulting reaction mixture was heated for 1.5 hours at 140° C. and then brought to reflux. Water was removed over a 2 hour period and then the mixture was refluxed for an additional 18 hours. A material was isolated by diluting the polymerization reaction mixture with chloroform to reduce the solids level to 10%. A product was obtained by reprecipitating the resulting solids in isopropanol. There was obtained a polymer which was dried in a vacuum oven at 210° C. for 18 hours. The product was a rubbery-like light-brown material having a glass transition temperature below room temperature and an IV of 1.4.

EXAMPLE 4

The procedure of Example 3 was repeated, except that m-phenylenediamine was also used in the polymerization mixture. There was utilized 1.5674 grams of m-phenylenediamine, 8.1222 grams of the above aminophenyl terminated polydimethylsiloxane, 10.032 grams of the aromatic bis(ether anhydride), 0.0034 grams of sodium phenylphosphinate and 40 ml. of orthodichlorobenzene. The resulting product was less flexible than the silicone-polyetherimide containing the silicone blocks having an average value of 19–21 dimethylsiloxy units. It exhibited a glass transition temperature at about 184° C. However, it had significantly superior flexibility was compared to polyetherimide resin resulting from the polymerization of m-phenylenediamine and the aromatic bis(ether anhydride) free of the aminophenyl terminated siloxane.

EXAMPLE 5

The procedure of Example 3 was repeated to make a variety of silicone-polyimides. Some of the silicone-polyimides were based on the use of polydimethylsiloxane having terminal aminophenyldimethylsiloxy units, while other silicone-polyimides were based on the use of polydimethylsiloxane having terminal aminopropyl-dimethylsiloxy units. In addition, the aminoorgano terminated polydimethylsiloxane was used in the form of a disiloxane and a polydimethylsiloxane having about 20 chemically combined dimethylsiloxy units. A further silicone-polyimide was made utilizing aromatic bis(ether anhydride) in accordance with Example 3 and difunctional amine material consisting of a mixture of equal molar amounts of m-phenylenediamine and aminopropyldimethylsiloxy terminated polydimethylsiloxane having about 20 chemically combined dimethylsiloxy units.

The above silicone-polyimides were then evaluated for thermal stability utilizing TGA analysis. The following results were obtained heating the respective silicone-polyimides in air at a heating rage of 10° C./min. to determine the temperature at which a 5% weight loss and 10% weight loss were experienced, where ArSi(2) indicates the phenyl substituted disiloxane containing silicone-polyetherimide and ArSi(20) indicates the phenyl terminated polydimethylsiloxane containing silicone-polyetherimide, while GAPSi(2) indicates the aminopropyldisiloxane containing silicone-polyetherimide and GAPSi(20) indicates the aminopropyldimethylsiloxane containing silicone-polyetherimide:

TABLE III

| Silicone-polyetherimide | Wt. Loss in Air (°C.) | |
|---|---|---|
| | 5% | 10% |
| ArSi(2) | 490 | 520 |
| GAPSi(2) | 463 | 470 |
| ArSi(20) | 430 | 445 |
| GAPSi(20) | 390 | 405 |

It was further found that the silicone-polyimide having chemically combined m-phenylene units experienced a 5% weight loss at 395 and a 10% weight loss at 410. This data indicates that the silicone polyimides obtained from the use of aminophenyl terminated polydimethylsiloxane have significantly higher oxidative stability than the silicone-polyimides derived from the use of aminopropyl terminated polydimethylsiloxane. In addition, the use of m-phenylenediamine in combination with aminopropyl terminated polydimethylsiloxane was found to enhance the oxidative stability of the resulting silicone-polyimide.

EXAMPLE 6

An additional evaluation of the flexibility of the silicone-polyetherimides of the present invention were made having polydimethylsiloxane blocks of about 17 chemically combined dimethylsiloxy units based on the use of aminopropyldimethylsiloxy terminated polydimethylsiloxane. The following results were obtained, where "n" is the number of dimethylsiloxy units in the silicone block, "Mol %" indicates the moles of dimethylsiloxy units in the silicone-polyetherimide based on total moles of chemically combined units, "MW" is the molecular weight of the silicone-polyetherimide and "Flex Mod" is the flexural modulus of the silicone-polyetherimide:

TABLE IV

| n | Mol % | MW | Flex Mod |
|---|---|---|---|
| 17 | 50 | 97,200 | 22,000 |
| 17 | 20 | 71,000 | 59,000 |
| 17 | 15 | 65,000 | 150,000 |
| 17 | 10 | 59,200 | 250,000 |

The above results show that mole percent of silicone diamine relative to the total moles of diamine used in making the slicone-polyimide and molecular weight can influence the flexural modulus.

Although the above examples are directed to only a few of the very many variables which can be used in the practice of the present invention to make the silicone-polyimide wire coating compositions, it should be understood that the present invention is directed to a much broader variety of aminoorganosiloxanes as shown by formula (1) and organic dianhydride as illustrated by formula (4) where $R^4$ can be further defined as a divalent $C_{(6-20)}$ aromatic organic radical which are shown in the description preceding these examples.

What is claimed is:

1. Extrudable, flame retardant, polydiorganosiloxane polyimide comprising by weight, (A) from about 40 to 90% of chemically combined aryletherimide units having the formula,

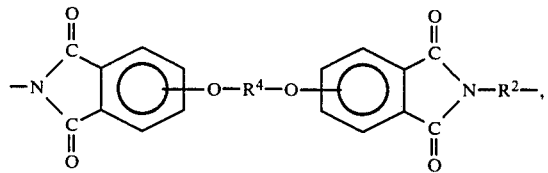

and (B) from about 10 to 60% of chemically combined polydiorganosiloxane consisting essentially of from about 11 to about 20 diorganosiloxy units, where the organo radicals attached to silicon are selected from monovalent $C_{(1-14)}$ hydrocarbon radicals and substituted monovalent $C_{(1-14)}$ hydrocarbon radicals, $R^2$ is selected from the class consisting of the same or different $C_{(1-14)}$ divalent hydrocarbon radicals, or substituted $C_{(1-14)}$ divalent hydrocarbon radicals, and $R^4$ is a divalent aryl radical selected from the class consisting of

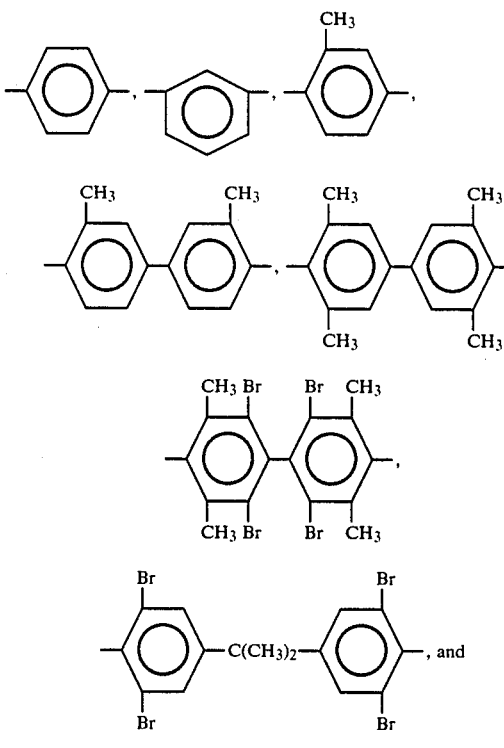

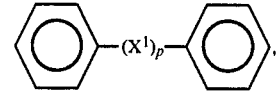

$X^1$ is a member selected from the class consisting of

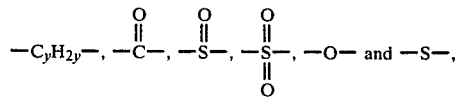

and p is 0 or 1, and y is an integer equal to 1 to 5 inclusive.

2. A polydiorganosiloxane-polyimide composition in accordance with claim 1 where the polydiorganosiloxane is polydimethylsiloxane.

3. A polydiorganosiloxane-polyimide composition in accordance with claim 1 having an elongation percent of greater than 100.

4. A polydiorganosiloxane-polyimide in accordance with claim 1 having about 25% to 45% by weight of polydiorganosiloxane.

5. A polydiorganosiloxane-polyimide composition in accordance with claim 1 consisting essentially of bisphenol A etherimide units chemically combined with a mixture of dimethylsiloxane and metaphenylene units.

6. A polydiorganosiloxane-polyimide composition in accordance with claim 1 where the polydiorganosiloxane is an alkylene terminated polydiorganosiloxane.

7. Extrudable flame retardant silicone-polyetherimide wire coating compositions having an elongation of at least 100% which satisfies the UL 94 V-O test.

8. Extrudable polydiorganosiloxane-polyimide in accordance with claim 1 wherein the polydiorganosiloxane block is a polydimethylsiloxane having an average of about 11 to 20 chemically combined dimethylsiloxy units.

9. Extrudable polydiorganosiloxane-polyimide in accordance with claim 1 where the aryletherimide units have the formula

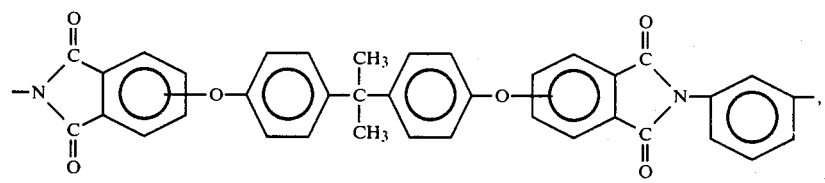

and the polydiorganosiloxane is a polydimethylsiloxane having an average of about 11 to about 20 chemically combined dimethylsiloxy units.

10. Extrudable polydiorganosiloxane-polyimide in accordance with claim 1 having about 25% to 45% by weight of polydiorganosiloxane.

* * * * *